(12) United States Patent
Mudalige et al.

(10) Patent No.: US 7,729,857 B2
(45) Date of Patent: Jun. 1, 2010

(54) SYSTEM FOR AND METHOD OF DETECTING A COLLISION AND PREDICTING A VEHICLE PATH

(75) Inventors: Upali Priyantha Mudalige, Troy, MI (US); Carroll C. Kellum, Rochester Hills, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 1322 days.

(21) Appl. No.: 11/207,168

(22) Filed: Aug. 18, 2005

(65) Prior Publication Data

US 2007/0043502 A1 Feb. 22, 2007

(51) Int. Cl.
*G08G 1/16* (2006.01)
(52) U.S. Cl. .................. 701/301; 701/93; 701/207; 701/213; 340/436; 340/901; 340/903
(58) Field of Classification Search .................. 701/93, 701/207, 213, 301; 340/435, 436, 903
See application file for complete search history.

(56) References Cited

U.S. PATENT DOCUMENTS

| | | | | |
|---|---|---|---|---|
| 5,375,059 A | * | 12/1994 | Kyrtsos et al. | 701/215 |
| 6,720,920 B2 | * | 4/2004 | Breed et al. | 342/386 |
| 6,768,944 B2 | * | 7/2004 | Breed et al. | 701/301 |
| 2002/0198632 A1 | * | 12/2002 | Breed et al. | 701/1 |

* cited by examiner

*Primary Examiner*—Gertrude Arthur Jeanglaud

(57) ABSTRACT

A collision detection and path prediction system (10) adapted for use with a traveling host vehicle (12) having an operator, includes a locator device (20) configured to determine the current position coordinates, and pluralities of trail and immediate dynamic path coordinates of the vehicle (12) and a communicatively coupled traveling remote vehicle (16). The system further includes a preferred controller (36) configured to predict a collision between the two vehicles (12,16) from the coordinates, and determine a plurality of projected path coordinates for the host vehicle (12) relative to the remote vehicle (16) trail coordinates.

29 Claims, 5 Drawing Sheets

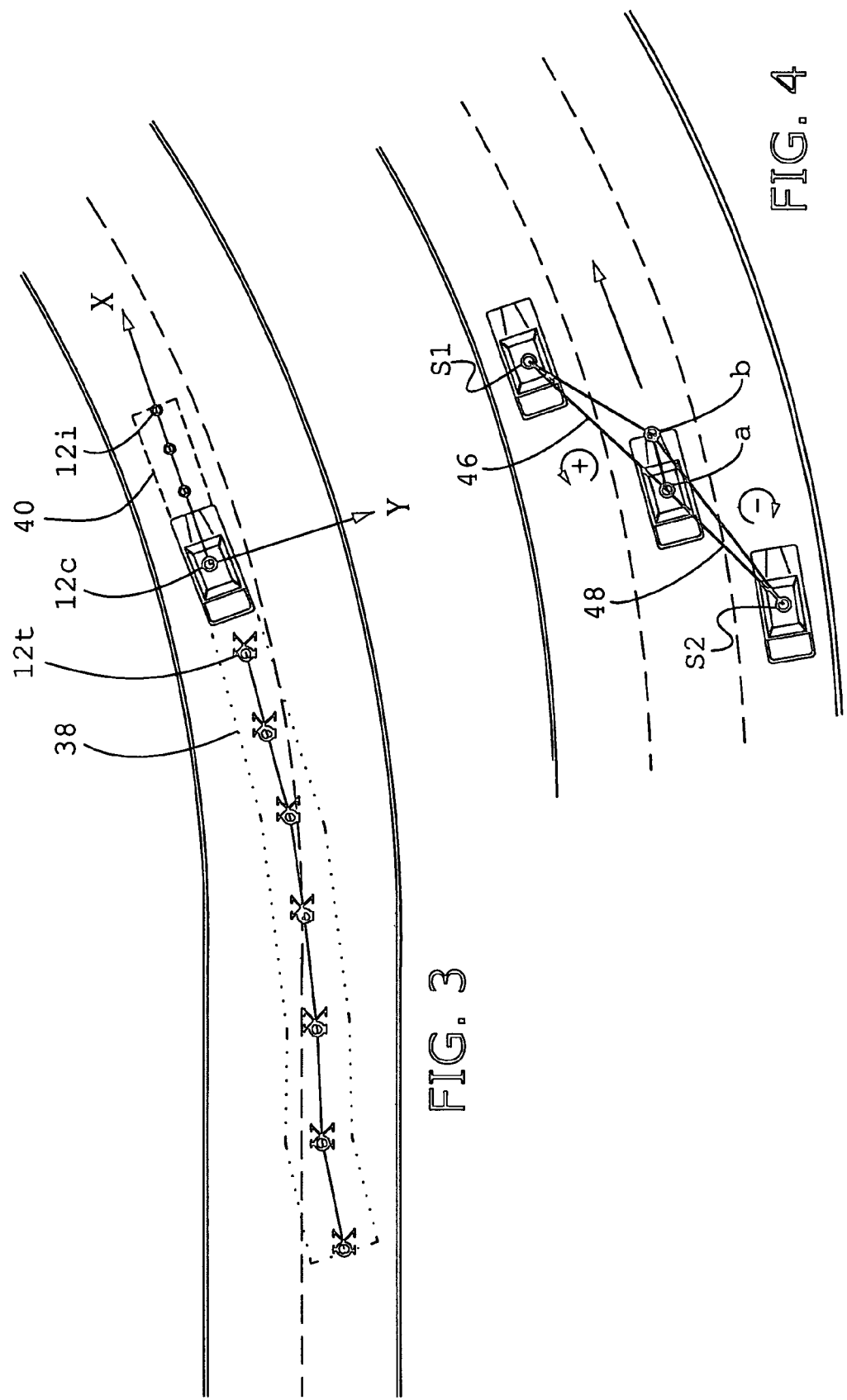

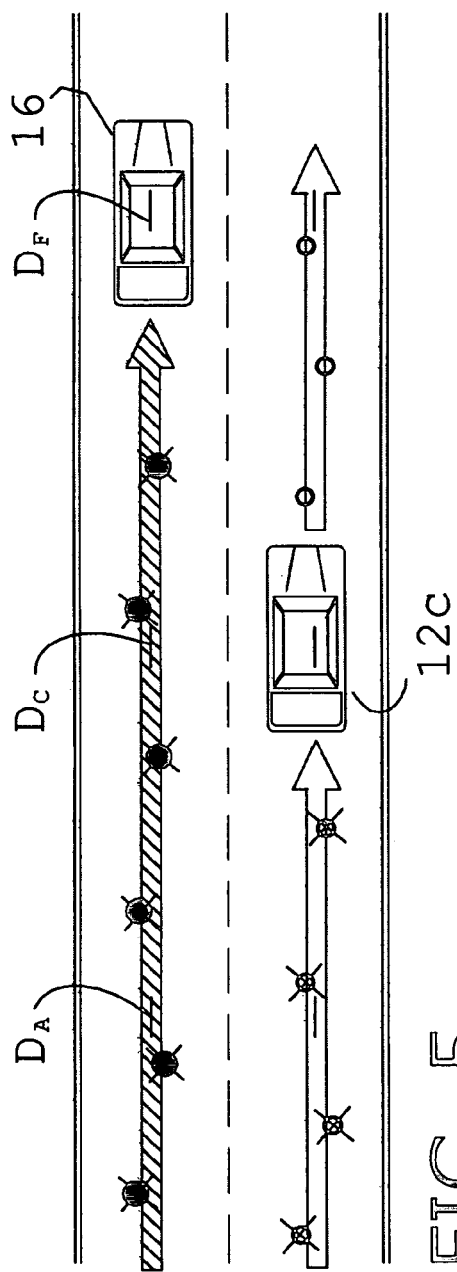
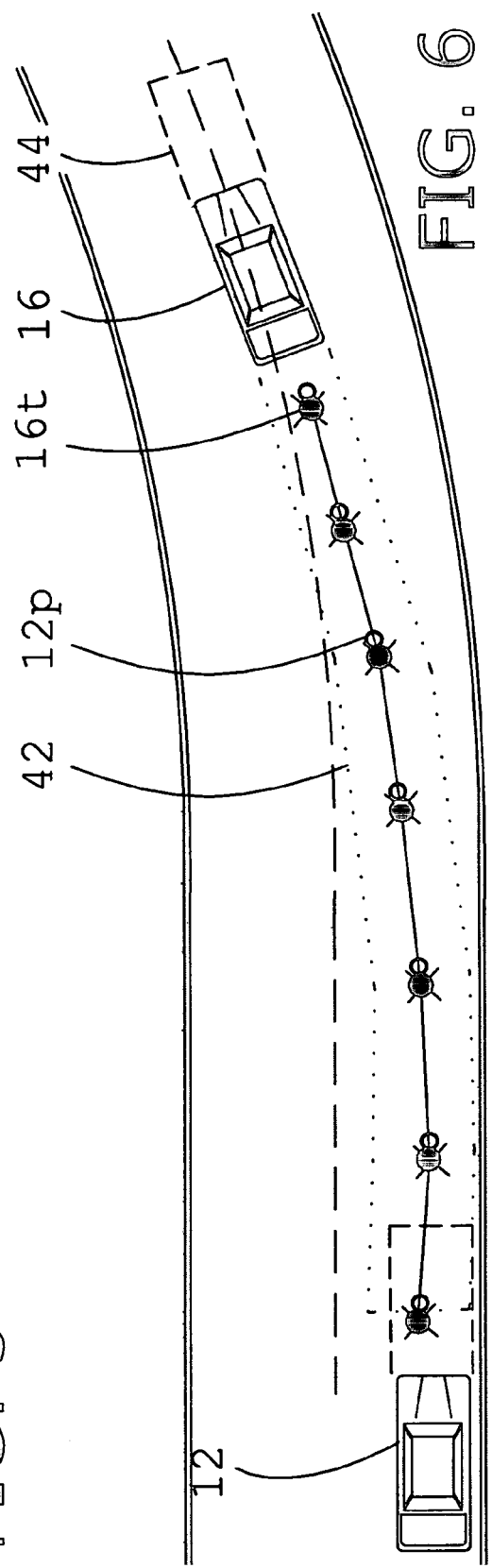

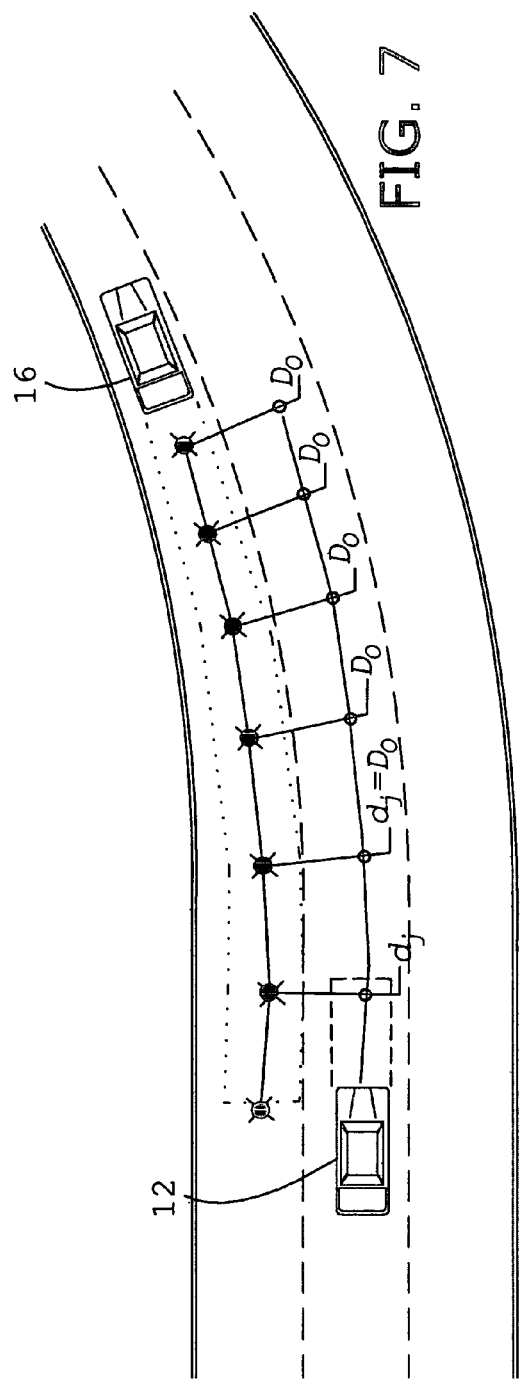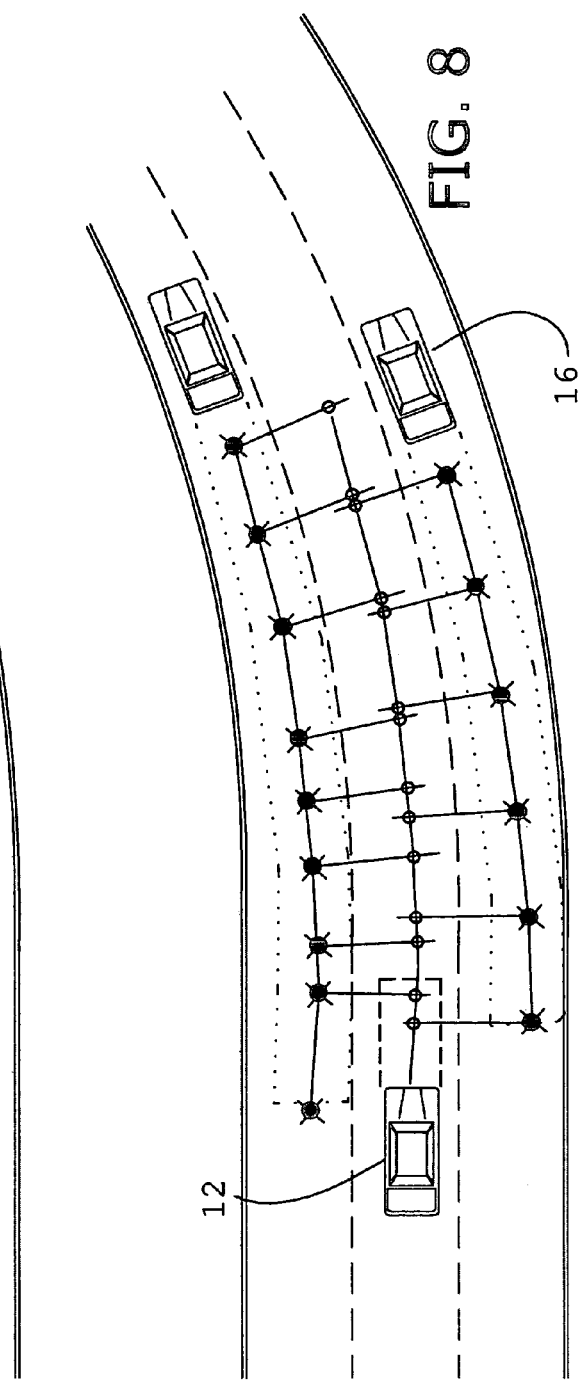

SYSTEM FOR AND METHOD OF DETECTING A COLLISION AND PREDICTING A VEHICLE PATH

BACKGROUND OF THE INVENTION

1. Technical Field

The present invention relates to collision avoidance systems adapted for use with a vehicle, and more particularly to an improved system configured to predict a projected path of a host vehicle, and detect a collision between the host vehicle and at least one other object.

2. Background Art

Collision control systems have been developed to reduce the likelihood of collisions between transportation machines, such as boats, aircrafts, and automotive vehicles. With respect to vehicles, these conventional safety applications rely upon the ability to determine the accurate relative positioning and predictable driving trajectories of the host and the surrounding vehicles to provide forward collision warning and effect automated braking in certain instances. In general, to identify the target vehicles that pose collision threats, current state of the art approaches use inputs from a variety of external vehicle sensors that detect surrounding vehicles and other objects. These sensory inputs are then utilized by a controller to determine a projected collision.

Though commonly used, these multi-sensor based systems present general concerns and inefficiencies. For example, to provide three-hundred-and-sixty degree detection numerous sensors are required, which significantly increase the total product and repair costs of the host vehicle. The numerous sensors are unreliable due to the extra complexity involved in interpreting and fusing sensory inputs in the final decision making algorithms. Further, the complexity of these conventional systems increases labor costs associated with training, manufacture, and design.

These systems are limited operationally due to inflexible vehicle-specific configurations. Of primary concern, these systems are limited by the capabilities of the sensors. For example, a rapidly approaching vehicle outside of the range of the applicable sensor(s) may collide with the host vehicle for lack of detection outside of a sufficient period from impact. Proper sensory performance is also affected by increasingly complex and over-burdened vehicle communication networks. In this instance, each separately performing sensor that presents an electrical control unit utilizes available bandwidth for inter-nodal communication. Where baud rates or capacity becomes insufficient, backlogging of sensory inputs may cause poor performance or the failure of the conventional system.

Finally, collision control systems are also limited in their ability to predict the future driving path of the host vehicle. In this regard, yaw-rate and steering angle sensors are conventionally used to predict the future path of the vehicle by assuming that the vehicle will undergo, for the immediate future, the same change in heading as is currently being commanded. The predictive capabilities of these systems, however, are limited by the ability of the operator to minimize steering angle and heading oscillations, which cause the predicted path to change dramatically. Further, the driving path of the vehicle often follows the shape of the roadway. For this reason, many systems attempt to identify the roadway or lane shape to perform path prediction, and often employ map databases and vision systems for this purpose. However, map systems are expensive, and vision systems may have trouble overcoming challenging environmental conditions due to limited views of the roadway.

DISCLOSURE OF INVENTION

Responsive to these and other concerns, a collision control system and method of predicting a vehicle path is described. The inventive system relies upon pluralities of positional coordinates for a host vehicle and at least one remote vehicle, to determine their immediate dynamic paths. The inventive system utilizes trigonometric relationships between the vehicles to predict a collision or a projected path for the host vehicle.

Relying on vehicle-to-vehicle (V2V) communication, a first aspect of the present invention concerns a path prediction system adapted for use with a traveling host vehicle spaced from and communicatively coupled to at least one traveling remote vehicle. The system includes a locator device configured to determine and store for at least a period current position coordinates, and a plurality of trail coordinates for each of said host and at least one remote vehicle. A controller is communicatively coupled to the device, and configured to autonomously determine a heading, and an immediate dynamic path for each of said host and remote vehicle, based on the current position coordinate, and pluralities of trail coordinates. The controller is further configured to determine a vehicle speed for each of said host and remote vehicles, and generate a signal or command, where the relative speeds, positions, and headings predict concurrently intersecting paths.

A second aspect of the present invention concerns a method of predicting the path of a traveling host vehicle using at least one traveling remote lead vehicle, by a controller. The method includes determining and storing, a plurality of trail coordinates, a current position coordinate, and heading, for at least one traveling remote vehicle, and determining a current position coordinate, and heading, for the host vehicle. The current position coordinates, and headings, for the host and said at least one traveling remote vehicles, are then compared to determine at least one traveling remote lead vehicle, wherein the lead vehicle is generally ahead of and traveling in the same general direction with the host vehicle. Finally, a plurality of sequential projected path coordinates for the host vehicle is determined, wherein each path coordinate is matched with and congruently related to a corresponding trail coordinate of a lead vehicle.

A third aspect of the present invention concerns a method of determining the paths of a traveling host vehicle and at least one traveling remote vehicle, and avoiding a future concurrent intersection of the paths, by a controller. The method includes determining and storing a plurality of the path coordinates for the host vehicle, and a plurality of path coordinates for said at least one remote vehicle. The pluralities of path coordinates are then compared to detect a future concurrent intersection of path coordinates. Finally, the path coordinates of either the host or remote vehicle are caused to be modified, so as to eliminate the future concurrent intersection of the paths.

It will be understood and appreciated that the present invention provides a number of advantages over the prior art, including, for example, predictively communicating to an operator of the host vehicle an imminently approaching collision. This invention increases the efficiency of collision control systems, by eliminating the use of sensors to detect host vehicle surroundings. The use of V2V communication, provides greater range and function than that of conventional sensor-based systems. The present invention is also useful for providing a method of tracking a lead vehicle through visually obstructed conditions.

Other aspects and advantages of the present invention will be apparent from the following detailed description of the preferred embodiment(s) and the accompanying drawing figures.

BRIEF DESCRIPTION OF DRAWINGS

A preferred embodiment of the invention is described in detail below with reference to the attached drawing figures, wherein:

FIG. 3 is a plan view of a host vehicle, and the trail coordinates, trail polygon, and immediate dynamic path polygon for the host vehicle traveling upon a thoroughfare;

FIG. 4 is a plan view of a host and two remote vehicles traveling within adjacent lanes, particularly illustrating lane determination vectors;

FIG. 5 is a plan view of a host vehicle and a remote vehicle traveling within adjacent lanes, particularly illustrating lateral offsets;

FIG. 6 is a plan view of a host vehicle and a remote lead vehicle traveling within the host vehicle lane, particularly illustrating the determination of a plurality of projected path coordinates for the host vehicle; and FIG. 7 is a plan view of a host vehicle and a remote lead vehicle traveling within a lane adjacent the host vehicle lane, particularly illustrating the determination of a plurality of projected path coordinates for the host vehicle; and FIG. 8 is a plan view of a host vehicle and two remote lead vehicles traveling within the left and right adjacent lanes to the host vehicle lane, particularly illustrating the initial pluralities of projected path coordinates for the host vehicle relative to the lead vehicles.

MODES FOR CARRYING OUT THE INVENTION

Figure 1:
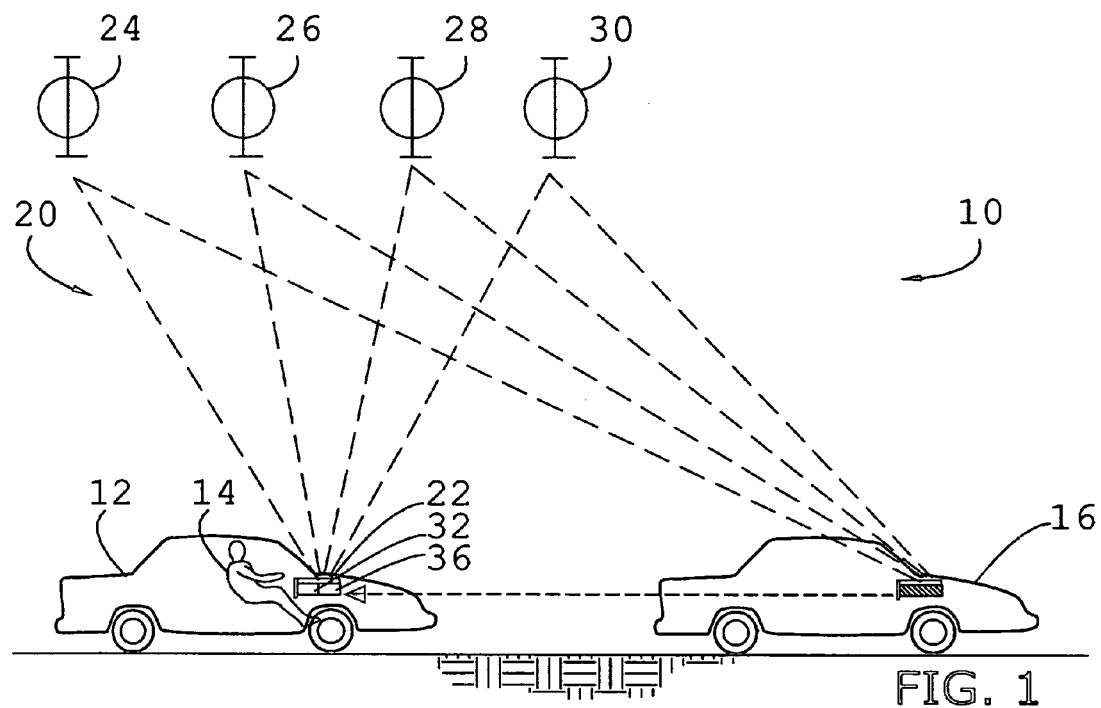
FIG. 1 is an elevation view of a host vehicle, and a remote vehicle communicatively coupled to the host vehicle, in accordance with a preferred embodiment of the present invention.

As shown in FIG. 1, the present invention concerns an improved collision control and path prediction system 10 adapted for use with a host vehicle 12 and by an operator 14. The system 10 is illustrated and described herein with respect to vehicles, such as cars, SUV's, trucks, etc. However, it may also be utilized with aircrafts, watercrafts, human motility, or other modes of transportation where projected path prediction or collision avoidance is desired. The system 10 is configured to determine a plurality of trail coordinates 12$t$, a current position coordinate 12$c$, and a plurality of immediate dynamic path ("IDP") coordinates 12$i$, for the host vehicle 12, and a similar set of coordinates 16$t$,16$c$,16$i$ for at least one remote vehicle 16 (see, FIG. 2). Except where a plurality is necessary for discussion, the present invention shall hereinafter be described with respect to a remote vehicle 16, with the understanding that the inventive aspects of the invention may be concurrently performed with respect to a plurality of remote vehicles.

Figure 1A:
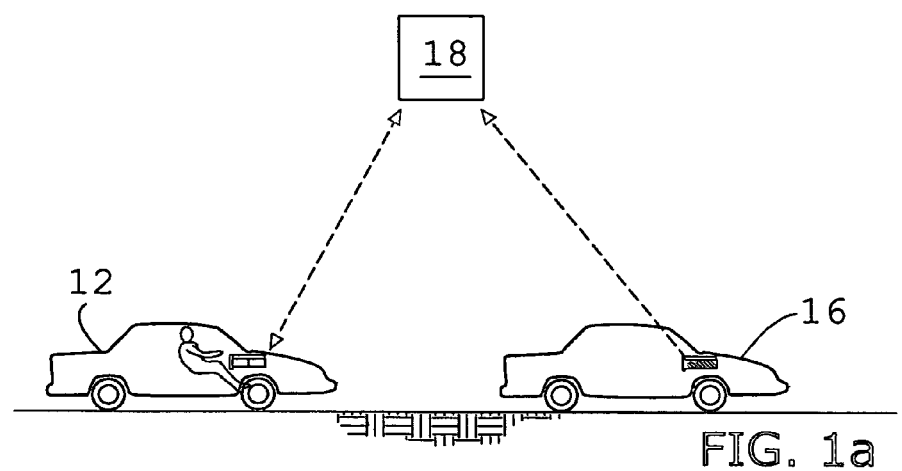
FIG. 1a is an elevation view of the host and remote vehicles shown in FIG. 1 communicating through a third-party intermediary.

It is appreciated by those ordinarily skilled in the art that many active safety applications for environments enabled with V2V communication, such as the preferred system 10, require lane level relative positioning and predicted driving paths for vehicles in the vicinity facilitated by V2V communication. Thus, in accordance with the present invention, the host vehicle 12 and remote vehicle 16 are communicatively coupled by suitable wireless technology. For example, the vehicles 12,16 may be coupled by a radio local area network, RF technology, or other conventional means that enables inter-vehicle sharing of information in real-time. Alternatively, the vehicles 12,16 may be communicatively coupled through an intermediary third-party 18 (see, FIG. 1a) that continuously collects the relevant coordinate data, performs the determinations described herein, and transmits continuous projected path data, signals and/or commands back to the host vehicle 12. It is further appreciated that the reliability of the safety application depends on the accuracy of the V2V communication system involved.

In general, the system 10 is configured to communicate information to the operator that may assist the operator in avoiding a potential collision of the vehicles 12,16, and more preferably, to autonomously cause the vehicle 12 to modify its path and/or speed when a collision is predicted. The preferred system 10 also enables the remote vehicle 16 to act as a lead vehicle for the host vehicle 12, by determining a plurality of host vehicle projected path coordinates 12$p$ relative to the remote vehicle trail coordinates 16$t$.

More particularly, a locator device 20 is adapted for use by the host vehicle 12. The device 20 is configured to determine and store for at least a period the current position coordinates 12$c$, 16$c$, and pluralities of trail coordinates 12$t$, 16$t$ for the host and remote vehicles 12, 16. As shown in FIG. 1, the preferred locator device 20 is configured to determine longitude, latitude and height coordinates using a Global Navigation Satellite System (GNSS), and as such, further includes a GNSS receiver 22 positioned within the vehicle 12, and a set of mapped satellites 24, 26, 28, 30 communicatively coupled to the receiver 22. Thus, the locator device 20 may function within an absolute coordinate system. Alternatively, other signal sources located at control points could be communicatively coupled to the receiver 22, and other coordinate systems based on a variety of geodetic datums, units, projections, and references, such as Military Grid Reference System (MGRS) or ECEF X,Y,Z could be utilized.

The preferred device 20 is also configured to correlate the vehicle positions, so as to determine the relative coordinates between the vehicles 12, 16 within a relative coordinate system, wherein the system updates as the vehicles 12, 16 travel. In the relative coordinate system, the received signal strength or time of flight for messages sent between vehicles or raw GNSS receiver range data such as range to satellites could be used to establish the relative positions between vehicles which could then be used to generate trail information.

The preferred locator device 20 may also include a map database 32 having at least one map record 32$a$ consisting of global positioning points. The device 20 is configured to match the host and remote vehicles' current position and trail coordinates to corresponding points on the map record 32$a$, as shown in FIG. 2. In this configuration, the preferred system 10 further includes a monitor 34 for displaying the map record 32$a$. The database 32 may be stored by conventional storage means, such as a DVD-ROM, internal hard disk, or removable memory card.

An inventive controller 36 is communicatively coupled to the device 20 and configured to autonomously determine a heading, a speed V, and trail and IDP polygons, for each of the host and remote vehicle 12,16, and projected path coordinates 12p for the host vehicle 12, based on the collected past positional data. The preferred controller 36 is further configured to generate a signal 34a, where concurrently intersecting paths (i.e., congruency in time and place) are detected. Alternatively, where polygons are not determined, the signal 34a may be generated when a generally concurrent intersection of path coordinates is detected, wherein the term "generally concurrent" means within a period based on the speeds and dimensions of the vehicles 12,16. Finally, the controller 36 is, more preferably, configured to deliver a command to at least one actuator (not shown) that controls an acceleration or deceleration component of the vehicle 12. For example, upon the determination of concurrently intersecting paths, a preferred controller may deliver a command to a brake module to decelerate the vehicle.

Figure 2A:
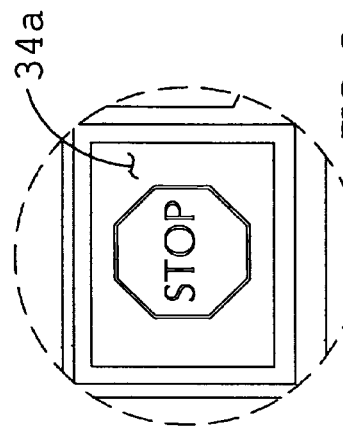
FIG. 2a is an elevation view of the monitor displaying a collision alert signal.

As shown in FIG. 2a, an exemplary collision detection signal 34a may include the display of a stop sign on the monitor 34. Alternatively, or in addition to a display signal, one of a plurality of audible announcement, such as "Danger Vehicle Approaching From The Rear" may be produced, depending upon the coordinates, and headings of the vehicles 12,16. The signal 34a may also be relayed through haptic communication means, or a combination of one or more audible, visual or haptic mediums.

Figure 2B:
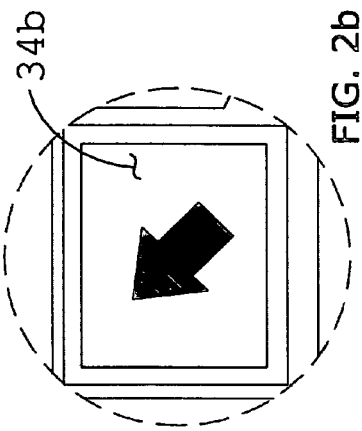
FIG. 2b is an elevation view of the monitor displaying a path deviation signal.
Figure 2:
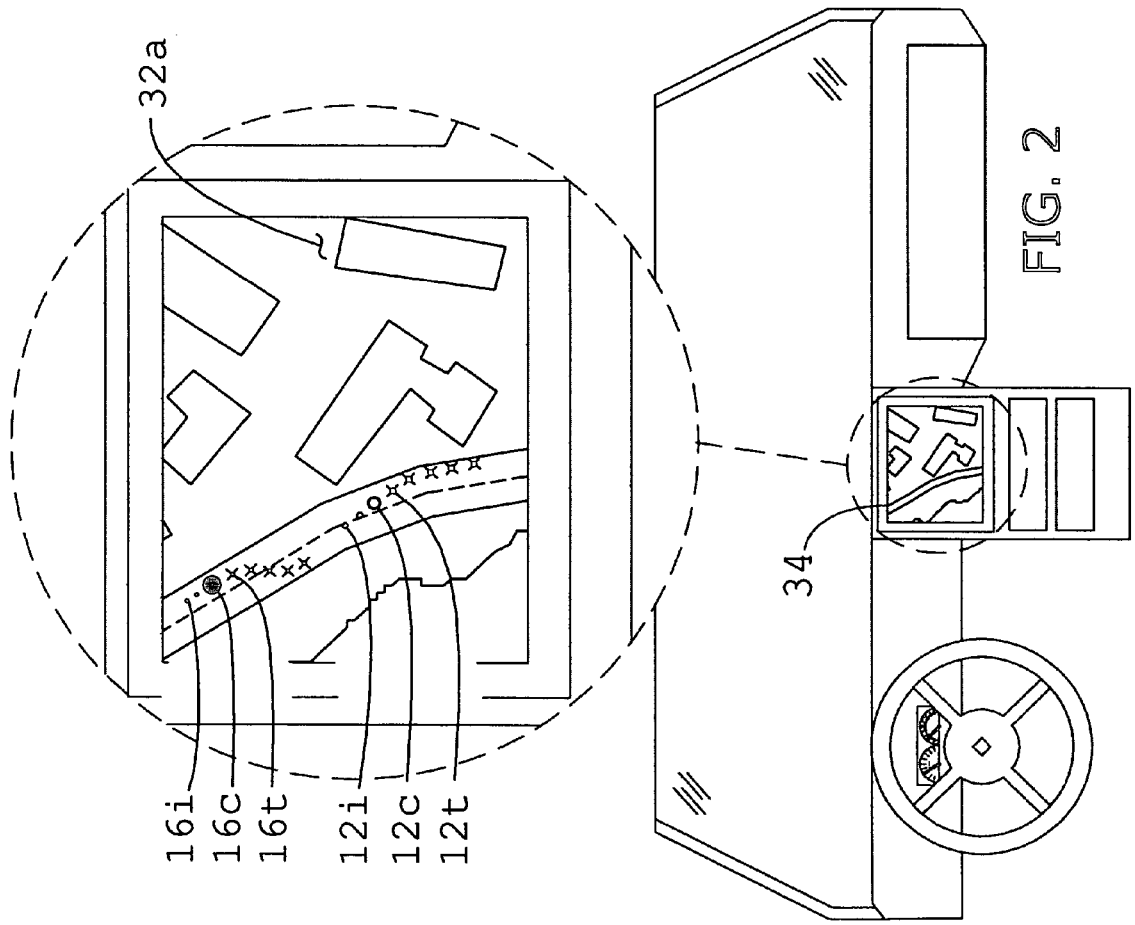
FIG. 2 is an elevation view of the dashboard of the host vehicle and collision control system shown in FIG. 1, particularly illustrating the monitor, and map record.

The preferred controller 36 is also configured to deliver a separate signal 34b, when the current position coordinate 12c and heading of the host vehicle 12 deviates greater than a minimum threshold from the projected path. As shown in FIG. 2b, an exemplary path deviation signal 34b may be a display of one of a plurality of arrows that direct the operator 14 towards the next approaching projected path coordinate 12p.

Most preferably, the controller 36 is configured to deliver one of a plurality of signals that convey varying degrees of deviation or alert. For example, each of the signals 34a,b may be one of a plurality of signals that differ in color, pitch, loudness, location, font, verbiage, flashing rates, etc. Finally, the signals 34a,b are provided for a predetermined and preferably modifiable period, sufficient to alert the operator 14 satisfactorily.

A preferred method of determining vehicle relative positioning and predicting a projected host vehicle path includes determining host vehicle trail and IDP coordinates. A host vehicle trail polygon 38 is then determined based on the trail coordinates 12t, and the host vehicle width (see, FIG. 3). Another polygon 40 is determined for the host vehicle IDP. For example, 10 seconds of trail coordinates at one-second intervals can be utilized for the trail polygon 38, and 2 seconds of future data can be calculated for the IDP polygon 40. Similarly, a remote vehicle path trail polygon 42 and remote vehicle immediate dynamic path polygon 44 are determined for each remote vehicle 16. Using the trail and current position coordinates, and relative headings of the host and remote vehicles 12,16, whether the remote vehicle 16 is moving in the same direction, opposite direction, or on an intersecting path with the host vehicle 12, is then determined. The remote vehicle 16 is classified into one of a plurality of lane level and position categories, including ahead host lane, ahead adjacent lane, ahead offset lane, behind host lane, behind adjacent lane, and behind offset lane. Next, whether the remote vehicle is merging and departing the host vehicle lane is determined by analyzing the path and trail intersections between the host and remote vehicles 12,16. Finally, the host vehicle projected driving path is determined using trails of at least one remote lead vehicle moving ahead of the host vehicle 12 in the same or adjacent lane. A preferred embodiment of the inventive algorithms and function of the controller 36 to accomplish these tasks are more particularly described as follows:

I. Identify Vehicles Traveling in the Same Direction

Remote vehicles 16 traveling in the same direction with the host vehicle 12 are determined by comparing the relative headings. Inequality (1) yields the subset of such vehicles:

$$\cos\theta_h \cos\theta_s + \sin\theta_h \sin\theta_s > 0.5 \quad (1)$$

wherein $\theta_h$ is the host vehicle heading, $\theta_s$ is the remote vehicle heading, and a true value for the inequality yields a same relative direction of travel. Conversely, a sum of the products less than 0.5 yields an opposite relative direction of travel for the host and remote vehicles 12,16. To simplify the process, the host vehicle heading $\theta_h$ is preferably set to zero for the chosen coordinate system.

II. Classify Vehicles Traveling in the Same Direction

Remote vehicles 16 traveling in the generally same direction as the host vehicle 12, are categorized in one of a plurality of relative positions by comparing the current position coordinates of the host and remote vehicles 12,16. By considering the host vehicle heading, these remote vehicles 16 may initially be separated into "behind" and "ahead" sets, wherein generally behind remote vehicles 16 are determined when the host vehicle acts to increase the distance therebetween. More preferably, remote vehicles 16 located behind of the host vehicle 12 are computationally determined by inequality (2):

$$(x_s-x_h)\cos\theta_h + (y_s-y_h)\sin\theta_h < 0 \quad (2),$$

wherein $x_s, y_s$ are coordinates of the remote vehicle 16, and $x_h, y_h$ are coordinates of the host vehicle 12; and remote vehicles 16 located ahead of the host vehicle 12 are computationally determined by inequality (2b):

$$(x_s-x_h)\cos\theta_s + (y_s-y_h)\sin\theta_s > 0 \quad (2b)$$

Height coordinates, $z_x$, are preferably not considered, so as to present a simplified planar analysis. It is appreciated that the non-treatment of height coordinates provides a factor of safety with respect to collision detection relative to the difference in height between the host and remote vehicles 12,16. It is also appreciated, however, that where V2V communication is not limited to generally planar vehicles, height analysis may be necessary to avoid false signaling while traversing an over-pass.

The remote vehicle 16 is located directly behind the host vehicle 12, when the vehicles are traveling in the same direction and the trail polygon 38 of the host vehicle 12 intersects with the IDP polygon 44 of the remote vehicle 16. Conversely, where the IDP polygon 44 of the host vehicle 12 intersects with the trail polygon 38 of the remote vehicle, and the vehicles 12,16 are traveling in the same direction, the remote vehicle 16 is in front of the host vehicle and in the same lane.

III. Classify Vehicles into Lane Level Traffic

Lane position (i.e., right adjacent/offset, left adjacent/offset lanes) with respect to the host vehicle lane is determined by computing the sign of a triangular area enclosed by a direction vector taken sequentially from a parametrically interior point of the host vehicle, a, such as its GPS receiver 22 point, a front-most point on the host vehicle 12, b, such as the front-most center point, and a parametrically interior point of the remote vehicle 16, s, such as the past GPS trail position which is closest to the host vehicle's current position, and the relative coordinates of the host and remote vehicles 12,16. As shown in FIG. 4, and for the purposes of calculating inequality (3), counter-clockwise vectors shall be deemed to form positive areas, and occur when the remote vehicle 16 is within a relatively left lane. Clockwise vectors are deemed to form negative areas, and occur where the remote vehicle 16 is within a relatively right lane. For example, in FIG. 4, the abs1 triangle 46 has a positive area, while the abs2 triangle 48 presents a negative area.

Inequality (3) determines the existence of a remote vehicle 16 in a leftward lane:

$$(b_x-a_x)(s_y-a_y)-(s_x-a_x)(b_y-a_y)>0 \quad (3),$$

wherein, $a_x,a_y$ are coordinates of the point a, $b_x,b_y$ are coordinates of the point b, and $s_x,x_y$ are coordinates of a point S. Likewise, where the difference of the products is less than zero (<0), the remote vehicle 16 is located within a right lane. It is appreciated, however, that for certain distances between the vehicles 12,16 on a curve, relative to the curve radius, the direction vector method of determining lane position may become inapplicable due to the upstream left and right lanes being on the same side of the host vehicle 12.

As such, relative lane position can alternatively be determined by computing a lateral offset between the trails and current position coordinates of the host and remote vehicles 12,16. With this method, shown in FIG. 5, thresholds can be used to define lane offsets. For example, a lateral offset between negative one and positive one may indicate that the host and remote vehicles 12,16 share the same lane (negative one to negative two may indicate a remote vehicle within the left adjacent lane, and positive one to two for the right adjacent lane, etc.). By taking a perpendicularly lateral offset at a given coordinate, it is appreciated that this method is equally functional on straight and curved thoroughfares. In FIG. 5, where the remote vehicle 16 acts as a lead vehicle, $D_A$, (aged distance) is the orthogonal distance between the trails of the host and remote vehicles 12,16, $D_C$, (current distance) is the distance between the current position coordinate 12c of the host vehicle and the remote vehicle trail, and $D_F$, (future distance) is the distance between a future path coordinate of the host vehicle 12 and the current position of the remote vehicle 16.

IV. Determine Lane Merging and Departing Vehicles

As a remote vehicle 16 merges into the host vehicle lane from behind, the remote vehicle IDP polygon 44 starts to intersect with the host vehicle trail polygon 38, to form an overlap area (A) (not shown) of increasing area. This situation is detected by the rate of change of the overlap area (A), per inequality (4).

$$\frac{dA}{dt}>0 \quad (4)$$

Similarly, a remote vehicle 16 departing the host vehicle lane, presents a decreasing area, such that the rate of change is less than zero (<0).

Thus, relative to the host vehicle 12, each remote vehicle 16 may be categorized into one of a plurality of categories, based on vehicle heading and current position coordinates, wherein said categories are selected from the group consisting of different roadway height (where height analysis is performed), oncoming, intersecting left, intersecting right, own lane front, own lane behind, ahead adjacent lane, ahead offset lane, behind adjacent lane, and behind offset lane. More preferably, each remote vehicle 16 is further configured to detect a lane change, based on the position coordinates, and heading of the remote vehicle 16, and transmit the coordinates and time of the lane change to the host vehicle 12. Accordingly, the host vehicle 12 is preferably configured to use the remote vehicle lane change information to modify the classification and lateral offset calculation described in part (V).

V. Predicting Host Vehicle Path

As previously described, the projected path of the host vehicle 12 is preferably determined with respect to at least one lead vehicle 16. More particularly, once at least one remote vehicle 16 is deemed a desired lead vehicle, one of three scenarios govern the determination of projected path coordinates 12p. First, where the lead vehicle 16 is within the same lane as the host vehicle 12, the future path coordinates 12p may be set to generally match the trail coordinates 16t of the lead vehicle 16, as shown in FIG. 6.

Where one lead vehicle 16 is located in an adjacent lane, the future path coordinates 12p may be set at a constant offset distance, $D_o$, from the trail coordinates 16t, that is measured perpendicularly from the trail polygon of the lead vehicle 16, as shown in FIG. 7. The preferred offset distance is determined and set equal to an actual perpendicular distance, $d_j$, between a host vehicle IDP coordinate 12i, and the line drawn by the nearest trail coordinates 16t of the lead vehicle, also shown in FIG. 7.

Finally, where a plurality of lead vehicles 16 are located within the adjacent left and right lanes, as shown in FIG. 8, a separate path is likewise determined relative to each of the plurality of lead vehicles 16. The resulting predicted paths are compared to detect a discrepancy, and/or otherwise error. Where no discrepancy or error is found, the longer of the pre-determined paths is taken as the predicted path of the host vehicle 12. Alternatively, the predicted path of the host vehicle 12 may be taken from an average or median path determined from the separate paths.

The preferred forms of the invention described above are to be used as illustration only, and should not be utilized in a limiting sense in interpreting the scope of the present invention. Obvious modifications to the exemplary embodiments and methods of operation, as set forth herein, could be readily made by those skilled in the art without departing from the spirit of the present invention. The inventors hereby state their intent to rely on the Doctrine of Equivalents to determine and assess the reasonably fair scope of the present invention as pertains to any system or method not materially departing from but outside the literal scope of the invention as set forth in the following claims.

What is claimed is:

1. A path prediction system (10) adapted for use with a traveling host vehicle (12) spaced from and communicatively coupled to at least one traveling remote vehicle (16), said system comprising:

a locator device (20) configured to determine and store for at least a minimum period current position coordinates, and a plurality of trail coordinates for each of said host and at least one remote vehicle (12,16); and a controller (36) communicatively coupled to the device (20), and configured to autonomously determine a heading, and a path for each of said host and remote vehicles (12,16), based on the current position coordinates, and plurality of trail coordinates for said each of said host and at least one remote vehicle, said controller (36) being further configured to determine a vehicle speed for each of said host and remote vehicles (12,16), and generate a signal or command, where the relative speeds, position coordinates, and headings project concurrently intersecting paths.

2. The system as claimed in claim 1, said locator device (20) being further configured to determine and store for at least a period relative current position and trail coordinates between the host and said at least one remote vehicle (12,16), so as to present a relative coordinate system.

3. The system as claimed in claim 1, said controller (36) being configured to further determine a projected path for the host vehicle (12), and generate a second signal or command, when a host vehicle current position coordinate deviates from the projected path.

4. The system as claimed in claim 3, said controller (36) being further configured to create a plurality of differing signals, wherein each signal indicates a different degree of deviation from the projected path.

5. The system as claimed in claim 4, said signal being further configured to direct the host vehicle (12) towards the projected path.

6. The system as claimed in claim 1, said device (20) including a map database (32) having at least one record (32a), wherein said record (32a) presents a plurality of global positioning points, said device (20) being configured to match the current position coordinate, and at least a portion of the remote vehicle trail coordinates with corresponding points on the record (32a), and display the record, said controller (36) being communicatively coupled to the database (32), and configured to determine a plurality of projected path coordinates for the host vehicle (12), and match the projected path coordinates with corresponding points on the record (32a).

7. A method of predicting the path of a traveling host vehicle (12) relative to at least one traveling remote lead vehicle (16), by a controller (36), said method comprising the steps of:
   a) determining and storing a plurality of trail coordinates, a current position coordinate, and heading, for at least one traveling remote vehicle (16);
   b) determining a current position coordinate and heading, for the host vehicle (12);
   c) comparing the current position coordinates, and headings, for the host vehicle (12) and said at least one traveling remote vehicle (16), to determine at least one traveling remote lead vehicle, wherein the lead vehicle is generally ahead of and traveling in the same general direction with the host vehicle (12); and
   d) determining a plurality of projected path coordinates for the host vehicle (12), wherein each path coordinate is matched with and congruently related to a corresponding trail coordinate of the lead vehicle.

8. The method as claimed in claim 7, steps a), b) and c) further including the steps of determining a vehicle speed V for each of said host and remote vehicles (12,16), determining and storing for each, a plurality of IDP coordinates based on the corresponding plurality of trail coordinates, current position coordinates, heading, and speed, and comparing the current position coordinates, headings, speeds, and IDP coordinates for the host vehicle (12) and said at least one traveling remote vehicle (16), to determine at least one traveling remote lead vehicle.

9. The method as claimed in claim 8, steps a) and b) further including the steps of determining a vehicle acceleration f, yaw rate, and steering wheel angle for each of said host and remote vehicles (12,16), and determining the plurality of IDP coordinates, such that the IDP coordinates present a length L based on the V, f, yaw rate, and/or steering wheel angle of the corresponding vehicle.

10. The method as claimed in claim 8, steps a) and b) further including the steps of determining a vehicle acceleration f for each of said host and remote vehicles (12,16), and determining for each the IDP coordinates, such that the IDP coordinates present an IDP length L, in accordance with the following equation:

$$L = 2(V+f).$$

11. The method as claimed in claim 7, step c) further including the steps of determining the direction of travel for each of said at least one remote vehicle (16) relative to the host vehicle (12) based on the headings of the host and said each of said at least one remote vehicles (12,16).

12. The method as claimed in claim 11, step c) further including the steps of determining the direction of travel for said at least one remote vehicle (16) relative to the host vehicle (12), according to the following inequality: $\cos\theta_h \cos\theta_s + \sin\theta_h \sin\theta_s > 0.5$, wherein $\theta_h$ is the host vehicle heading, $\theta_s$ is the remote vehicle heading, and a true value for the inequality yields the same relative direction of travel.

13. The method as claimed in claim 7, step c) further including the steps of determining the ahead or behind condition of said at least one remote vehicle (16) relative to the host vehicle (12) based on the headings and current position coordinates of the vehicles (12,16).

14. The method as claimed in claim 13, step c) further including the steps of determining the condition of said at least one remote vehicle (16) relative to the host vehicle (12), according to the following inequality: $(x_s - x_h)\cos\theta_h + (y_s - y_h)\sin\theta_h < 0$, wherein $\theta_h$ is the host vehicle heading, $x_s, y_s$ are coordinates of the remote vehicle (16), $x_h, y_h$ are coordinates of the host vehicle (12), and a true value for the inequality occurs when the remote vehicle (16) is behind the host vehicle (12).

15. The method as claimed in claim 7, step c) further including the steps of categorizing said at least one remote vehicle (16) into one of a plurality of categories, based on the vehicle heading and current position coordinates, wherein said categories are selected from a group consisting essentially of different roadway height, oncoming, intersecting left, intersecting right, ahead host lane, ahead adjacent lane, ahead offset lane, behind host lane, behind adjacent lane, and behind offset lane.

16. The method as claimed in claim 15, wherein categorizing said at least one remote vehicle (16) into one of a plurality of categories is determined by analyzing a direction vector sequentially taken from a parametrically interior host vehicle point a, to a front most host vehicle point b, and to a parametrically interior remote vehicle trail point S, so that only a counter-clockwise vector is positive, and the remote vehicle (16) is located in a leftward lane when the following inequality is true: $(b_x - a_x)(s_y - a_y) - (s_x - a_x)(b_y - a_y) > -0$, and, $a_x, a_y$ are coordinates of the point a, $b_x, b_y$ are coordinates of the point b, and $s_x, x_y$ are coordinates of the point S.

17. The method as claimed in claim 15, wherein the relative lane position for said at least one remote vehicle (16) is determined by computing lateral offsets between trail and current position coordinates, for the host vehicle (12) and said at least one remote vehicle (16), and comparing the offsets to a plurality of thresholds.

18. The method as claimed in claim 15, wherein the remote vehicle (16) is categorized in the ahead host lane, and the plurality of projected path coordinates for the host vehicle (12) is determined such that each of the path coordinates is congruent to a corresponding remote vehicle trail coordinate.

19. The method as claimed in claim 15, wherein the remote vehicle (16) is categorized in the ahead adjacent or offset lane, and the plurality of projected path coordinates for the host vehicle (12) is determined such that each of the path coordinates is spaced at a generally constant lateral offset, as measured perpendicularly from a corresponding remote vehicle trail coordinate.

20. The method as claimed in claim 19, wherein the lead vehicle is further configured to detect a lane change and transmit the coordinates and time of the lane change to the host vehicle (12), and the host vehicle (12) is further configured to modify the categorization or lateral offset based on the lane change.

21. The method as claimed in claim 19, wherein a plurality of remote vehicles (16) are categorized in the ahead adjacent and offset lanes, initial pluralities of projected path coordinates for the host vehicle (12) are determined relative to each of said plurality of remote vehicles (16) and compared, and a final plurality of projected path coordinates is determined from the longest of said initial pluralities of path coordinates.

22. A method of predicting the paths of a traveling host vehicle (12) and at least one traveling remote vehicle (16), and avoiding a future concurrent intersection of the paths, by a controller (36), said method comprising the steps of:
   a) determining and storing a plurality of the path coordinates for the host vehicle (12);
   b) determining and storing a plurality of the path coordinates for said at least one remote vehicle (16);
   c) electronically comparing the pluralities of path coordinates to detect a future concurrent intersection of path coordinates; and
   d) generating electrical signals for causing the path coordinates of either the host or remote vehicle to be modified, so as to eliminate the future concurrent intersection of the paths.

23. The method as claimed in claim 22, steps a), b), and d) further including the steps of determining a host vehicle speed, a remote vehicle speed, and causing the host vehicle (12) to decelerate or accelerate.

24. The method as claimed in claim 22, steps a), b) and c) further including the steps of determining a path polygon, for each of said host and remote vehicles (12,16), based on the corresponding plurality of path coordinates, and vehicle width, and detecting a concurrent overlap area between the path polygons.

25. The method as claimed in claim 22, step c) further including the steps of comparing the pluralities of path coordinates to detect a future generally concurrent intersection of path coordinates.

26. The method as claimed in claim 22, steps a), b) and c) further including the steps of determining and storing for each of said host and remote vehicles (12,16) a plurality of trail coordinates, and a current position coordinate, and comparing the pluralities of trail coordinates, and current position coordinates.

27. The method as claimed in claim 26, steps a), b) and c) further including the steps of determining a path polygon, and a trail polygon for each of said host and remote vehicles (12,16), based on the corresponding plurality of path or trail coordinates, and the vehicle width, and detecting an overlap area between one of the host path and trail polygons and one of the remote path and trail polygons.

28. The method as claimed in claim 27, step c) further including the steps of determining a temporally increasing or decreasing area.

29. A computer program implementing the method of claim 22 when executed by an electronic device associated with a host vehicle (12) traveling a distance from at least one traveling remote vehicle (16) or object.

\* \* \* \* \*